(12) United States Patent
Hind et al.

(10) Patent No.: US 6,463,440 B1
(45) Date of Patent: Oct. 8, 2002

(54) RETRIEVAL OF STYLE SHEETS FROM DIRECTORIES BASED UPON PARTIAL CHARACTERISTIC MATCHING

(75) Inventors: John R. Hind; David Bruce Lection; Leonard Douglas Tidwell, II, all of Raleigh; Brad B. Topol, Apex; Ajamu A. Wesley, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/287,988

(22) Filed: Apr. 8, 1999

(51) Int. Cl.[7] ............................................. G06F 17/30
(52) U.S. Cl. ..................................... 707/102; 707/513
(58) Field of Search ................................. 707/102, 513

(56) References Cited

U.S. PATENT DOCUMENTS

| | | | |
|---|---|---|---|
| 5,584,026 A | | 12/1996 | Knudsen et al. ............. 395/601 |
| 5,734,907 A | | 3/1998 | Jarossay et al. ............. 395/708 |
| 6,049,664 A | * | 4/2000 | Dale et al. .................. 717/174 |
| 6,076,104 A | * | 6/2000 | McCue ....................... 345/719 |
| 6,161,114 A | * | 12/2000 | King et al. ................. 707/500.1 |
| 6,167,409 A | * | 12/2000 | DeRose et al. ............... 707/10 |
| 6,182,092 B1 | * | 1/2001 | Francis et al. ............... 707/513 |
| 6,226,675 B1 | * | 5/2001 | Meltzer et al. ............. 370/466 |
| 6,230,173 B1 | * | 5/2001 | Ferrel et al. ............... 707/501.1 |
| 6,233,592 B1 | * | 5/2001 | Schnelle et al. ............ 345/848 |
| 6,263,332 B1 | * | 7/2001 | Nasr et al. ................ 707/104.1 |
| 6,272,493 B1 | * | 8/2001 | Pasquali ..................... 707/10 |
| 6,272,673 B1 | * | 8/2001 | Dale et al. .................. 717/100 |
| 6,336,124 B1 | * | 1/2002 | Alam et al. ................. 707/523 |

* cited by examiner

*Primary Examiner*—Wayne Amsbury
(74) *Attorney, Agent, or Firm*—Jeanine S. Ray-Yarletts; Marcia L. Doubet

(57) ABSTRACT

A method, system, and computer-readable code for retrieving style sheets from a directory or other repository, based upon partial characteristic matching. Characteristics are associated with style sheets, and retrieval is accomplished by specifying a pattern which includes one or more of the characteristics. Preferably, the style sheet characteristics are stored as LDAP (Lightweight Directory Access Protocol) objects in an LDAP directory. The style sheets may be encoded in Extensible Stylesheet Language (XSL), Document Style Semantics and Specification Language (DSSSL), or any other style sheet language having equivalent semantics.

27 Claims, 6 Drawing Sheets

```
<xsl>
<xsl xmlns:chars="http://www.ibm.com/char-DTD/>   306
    <chars:XMLlang>PGML</chars:XMLlang>
    <chars:DEVICE>VELO500</chars:DEVICE>
    <chars:DISPLAY>gray</chars:DISPLAY>
    <chars:DISPLAYBITS>4</chars:DISPLAYBITS>
    <chars:WIDTH>300</chars:WIDTH>
    <chars:HEIGHT>200</chars:HEIGHT>
    <chars:SOUND>no</chars:SOUND>
    <chars:IMAGEFIDELITY>transcode</chars:IMAGEFIDELITY>
    <chars:IMAGESIZE>shrink</chars:IMAGESIZE>
    <chars:TABLES-DESIRED>yes</chars:TABLES-DESIRED>
    ...
</xsl>
```

```
/XMLLANG.PGML/DEVICE.VELO500/DISPLAY.gray/DISPLAYBITS.4/WIDTH.300/HEIGHT.200/SOUND.no
/IMAGEFIDELITY.transcode/IMAGESIZE.shrink/TABLES-DESIRED.yes
```

```
(& (ATT2=*/DEVICE.VELO500*) (ATT2=*/XMLLANG.PGML*))

(& (ATT2=*/IMAGESIZE.shrink*) (ATT2=*/XMLLANG.PGML*))

(& (ATT2=*/WIDTH.300*) (ATT2=*/XMLLANG.PGML*))
```

```
(& (ATT2=DEVICE.VELO*) (ATT2=XMLLANG.PGML))

(& (ATT2=IMAGESIZE.shrink) (ATT2=XMLLANG.PGML))

(& (ATT2=WIDTH.300) (ATT2=XMLLANG.PGML))
```

RETRIEVAL OF STYLE SHEETS FROM DIRECTORIES BASED UPON PARTIAL CHARACTERISTIC MATCHING

RELATED INVENTIONS

IBM application Ser. No. 09/287,989 entitled "Dynamically Determining the Most Appropriate Location for Style Sheet Application" and Ser. No. 09/288,838 entitled "Achieving Complex Transformations with Dynamic Style Sheet Coalescing", filed concurrently herewith on Apr. 8, 1999.

BACKGROUND OF THE INVENTION

1. Field of the Invention

The present invention relates to a computer system, and deals more particularly with a method, system, and computer-readable code for retrieving style sheets from a directory or other repository, based upon partial characteristic matching. Characteristics are associated with style sheets, and retrieval is accomplished by specifiying a pattern which includes one or more of the characteristics. Preferably, the style sheet characteristcs are stored as LDAP (Lightweight Directory Access Protocol) objects in an LDAP directory.

2. Description of the Related Art

A "style sheet" is a specification of a style that is to be used when presenting a document. The style specification includes information such as the font and margins to be used, the formatting layout, and other types of information that indicate how the presented document should appear. Style sheets can be used for many types of presentation of a document, including printing the document, displaying it on a video display, processing the document by a speech synthesizer, etc. Consequently, style sheets may also be utilized to describe transformations from one document type to another (e.g. from MathML to HTML) or as filters which describe transformations to reduce the amount of content while maintaining the original document type.

One type of style sheet is an XSL Style Sheet. XSL Style Sheets are style sheets specified in XSL, which is a particular style sheet language. "XSL" is an acronym for "Extensible Stylesheet Language". An XSL Style Sheet specifies how an XML document is to be transformed for presentation, resulting in a different document which may or may not maintain the original document type. "XML" is an acronym for "Extensible Markup Language, and is a trademark of Massachusetts Institute of Technology. XML is a standardized formatting notation, created for structured document interchange on the World Wide Web (hereinafter, "Web"). (Refer to "Extensible Markup Language (XML), W3C Recommendation Feb. 10, 1998" which is available on the World Wide Web at http://www.w3.org/TR/1998/REC-xml-19980210, for more information on XML; and to "Extensible Stylesheet Language (XSL), Version 1.0, World Wide Web Consortium Working Draft Dec. 16, 1998", hereinafter "XSL Specification", which is available on the Web at http://www.w3.org/TR/WD-xsl, for more information on XSL.)

Style sheets include "template rule" constructs, which define an input pattern and a template (also known as an "action") to use in creating an output result tree fragment. When applying a style sheet, the patterns in the templates are matched against the syntax of the source document. When a match is found with the template pattern, an output document fragment is created according to the actions specified in the template (which may include processing additional elements in the source document beyond the matching element). The source document is parsed recursively, until no more matching patterns are found. The resulting document fragments are then aggregated to yield a complete output document. (For more information on this process, refer to section 2, "Tree Construction", in the XSL Specification.) It is this template matching and substitution of different document elements according to the actions in the matching rules that enables style sheets to transform documents. (While the term "document" is used herein when discussing encoded data and application of style sheets thereto, it is to be understood that the information on which a style sheet operates may represent any type of information, and is not limited to the traditional interpretation of the word "document". As one example, a style sheet may be used to process an encoded representation of records from a data repository which specify a company's sales data. As another example, a style sheet may be used to format employee information retrieved from a corporate database for presentation. For ease of reference, the term "document" will be used herein to refer to these diverse types of information.)

XML is emerging as a powerful methodology for representing document content, due to its ability to store data in a self-defining, portable manner. Style sheet languages such as XSL, along with their associated processors, are powerful tools for filtering data content encoded in notations such as XML, as well as for transforming documents encoded in one markup language into other markup languages (or vocabularies) such as HTML (HyperText Markup Language) or WML (Wireless Markup Language). XML documents are evolving in a manner in which style sheets are also being used to perform custom tailoring of content information. For example, style sheets may be written to search for and extract a specific subset of the information contained in the XML document. Or, a style sheet might tailor the information so that it can be delivered to a particular device, transforming the document for the characteristics of the device (such as which browser will be used to render the document, the screen size of the device, whether the screen supports color or grayscale, etc.). The need to perform this type of content tailoring is increasing rapidly as the popularity of new types of computing devices, such as pervasive computing devices, increases. Pervasive computing devices are typically small, constrained-storage devices such as "Smart Phones" or the WorkPad device from the International Business Machines Corporation (IBM). ("WorkPad" is a registered trademark of IBM.) These devices are typically designed to be portable, and therefore are often connected to a network using a relatively expensive wireless connection, which may have limited bandwidth. Pervasive computing devices are often quite different from the devices an end-user might use in an office setting, such as a desktop computer. For example, the display screen on the devices may be quite small, and may not support color display, audio, etc. Thus, XML documents which were originally created with the expectation that the document would be rendered on a full-function desktop computer may contain a significant amount of content that cannot be presented to the user of the smaller, low-end device. In fact, when a document includes large objects such as image, video, or audio files, it is quite possible that the low-end device will not have sufficient storage space to even receive the document. In the current art, the style sheet that is to be used for transforming a document is specified statically, using various techniques such as an in-line style sheet encoded within a document, or an externally-stored style sheet that is referenced from a document using a processing instruction. As more and more new types of computing devices are developed, the less likely it will be that a document content developer will be able to predict the environment in which his document will be rendered and the more likely it will be that the document will contain content inappropriate for users having a wide variety of computing devices, such that a statically-specified style sheet is no longer adequate.

In view of this situation, it would be desirable to dynamically select one or more style sheets that tailor a document for presentation in a specific target environment. For pervasive computing devices, it will often be useful to filter audio data out of the document, to perform transcoding processes to replace full-color images with grayscale images, etc. These types of transformations would adapt the content to the device's physical capabilities, as well as greatly reduce the size of the document (thereby reducing the cost of transmitting the document, and increasing the likelihood that sufficient storage space will be available for receiving the document). In addition to tailoring a document for the characteristics of the device, it would also be beneficial to determine that a specific browser is running on the device, and transform the document for rendering by that browser when necessary. For example, a document encoded in a data file may not include any images or video files (and therefore might not benefit significantly from a reduction in size), but it may be desirable to transmit this document from a server to a particular handheld device. If the document is encoded in one markup language, such as XML, while the browser on the device is only capable of supporting a different markup language such as WML or WBXML ("Wireless Application Protocol Binary XML"), then a transformation process needs to be performed. An appropriate transforming style sheet may be used to perform these transformation processes. Transformations of this type may be beneficial in the wireless environment and with pervasive computing devices, and in any other environment where it is desirable to transform the content in a file. (Note that the word "file" is used in this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.)

The preceding discussion illustrates the valuable role that transforming style sheets have to play in tailoring content based on device characteristics. In addition, transformations based upon user preferences (such as may be stored in a directory or other repository) would also be beneficial. For example, a user preference may specify that all documents are to be presented using large fonts, or avoiding specific colors on a display, or using a voice synthesizer. A style sheet can be written that transforms documents to address these user preferences.

Some significant problems associated with using style sheets to tailor document content in this manner have been addressed. The first related invention, "Dynamically Determining the Most Appropriate Location for Style Sheet Application", determines whether the appropriate location for applying style sheets to transform a document is the server (and/or a Web proxy) or the client. This determination considers such factors as whether the client device has the capability for style sheet processing and whether it can resolve any dynamic parameters (such as user preferences) in a style sheet, and then adapts the style sheets accordingly. The second related invention, "Achieving Complex Transformations with Dynamic Style Sheet Coalescing", discloses a novel technique for dynamically determining one or more transformations that may be used to transform an input document in a first notation into a document in a different notation, where the output notation is tailored to (among other things) the target environment where the document will be rendered for presentation. However, a number of areas remain which need to be addressed in order for style sheets to be used optimally in transforming documents for their target environment.

One issue that remains with using style sheets to tailor document content for its target environment is the ability to retrieve the style sheet (or sheets) that will provide a transformation that is most appropriate for the characteristics of this target environment. Preferably, the style sheet selected and retrieved would be one that most closely matches any user preferences, and is suitable for the device and browser. One approach to solving this problem would be to send a group of style sheets to a proxy or a browser, with the most appropriate style sheet being selected at that location. However, this assumes that such a selection mechanism is available, which is unlikely. Furthermore, this approach may waste a significant amount of network bandwidth if a large number of potential style sheets exist.

A second issue that remains with using style sheets to tailor document content for its target environment is that, in some cases, the user may have custom style sheets which are more appropriate for his needs than other available style sheets which perform more general transformations. In this situation, it would be beneficial to attempt to retrieve the user-specific style sheets whenever appropriate, using more general style sheets as a default when the custom style sheet cannot be used.

Accordingly, a need exists for a technique by which the problems discussed above for retrieving style sheets which tailor document content to a target environment can be addressed.

The present invention provides a technique for associating characteristics with style sheets, and using those characteristics in a pattern-matching process to select and retrieve one or more style sheets that are appropriate in a given situation.

SUMMARY OF THE INVENTION

An object of the present invention is to provide a technique for using style sheet characteristics to select and retrieve an appropriate style sheet for a target environment.

Another object of the present invention is to provide this technique whereby the pattern matching process uses a selected subset of the style sheet characteristics.

Yet another object of the present invention is to provide this technique whereby the characteristics represent user preferences and/or device and browser capabilities.

A further object of the present invention is to provide this technique whereby a directory database is used to store the style sheet characteristics, such that the pattern-matching process leverages existing search facilities.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for use in a computing environment capable of having a connection to a network, for retrieving style sheets from a repository based upon partial characteristic mapping. This technique comprises: associating one or more characteristics with each of one or more style sheets; extracting each of the associated characteristics for selected ones of the style sheets; and storing the extracted characteristics for each of the selected style sheets in the repository, along with an identifier of the selected style sheet to which the stored characteristics pertain. The technique may further comprise: specifying a pattern for a desired set of characteristics; matching the pattern against a collection of the stored characteristics from the repository; and retrieving a particular style sheet using the style sheet identifier located by the matching when the matching has a successful result. Preferably, the associated characteristics are specified as pairs, each of the pairs comprising a characteristic identifier and a characteristic value for the identifier. The pattern may comprise one or more sub-patterns, each of the sub-patterns comprising a specified characteristic identifier and a specified characteristic value, wherein the specified characteristic identifier and the specified characteristic value may use one or more wildcard characters.

In one aspect, the technique further comprises: creating an object, wherein the object comprises: a first attribute, a second attribute, and a third attribute; and wherein the storing further comprises: storing a unique identifier of the object in the first attribute; storing the stored extracted characteristics in the second attribute, wherein the characteristic pairs are delimited from one another using a first special character and wherein the characteristic identifier is delimited from the characteristic value in each of the pairs using a second special character; and storing the identifier of the selected style sheet in the third attribute.

In another aspect, the technique further comprises: creating an object, wherein the object comprises: a first attribute, a second attribute, and a third attribute; and wherein the storing further comprises: storing a unique identifier of the object in the first attribute; storing the extracted characteristics as an unordered set of values in the second attribute, wherein each of the values stores one of the pairs; and storing the identifier of the selected style sheet in the third attribute. In this aspect, the characteristic identifier and the characteristic value in each of the pairs may be delimited using a special character.

In these aspects, the repository may be a directory database. This directory database may be an LDAP database, and the object may be an LDAP object.

The present invention will now be described with reference to the following drawings, in which like reference numbers denote the same element throughout.

BRIEF DESCRIPTION OF THE DRAWINGS

FIGS. 3A through 3D depict examples of characteristics and search patterns with which operation of the preferred embodiments of the present invention are illustrated;

DESCRIPTION OF THE PREFERRED EMBODIMENT

Figure 1:
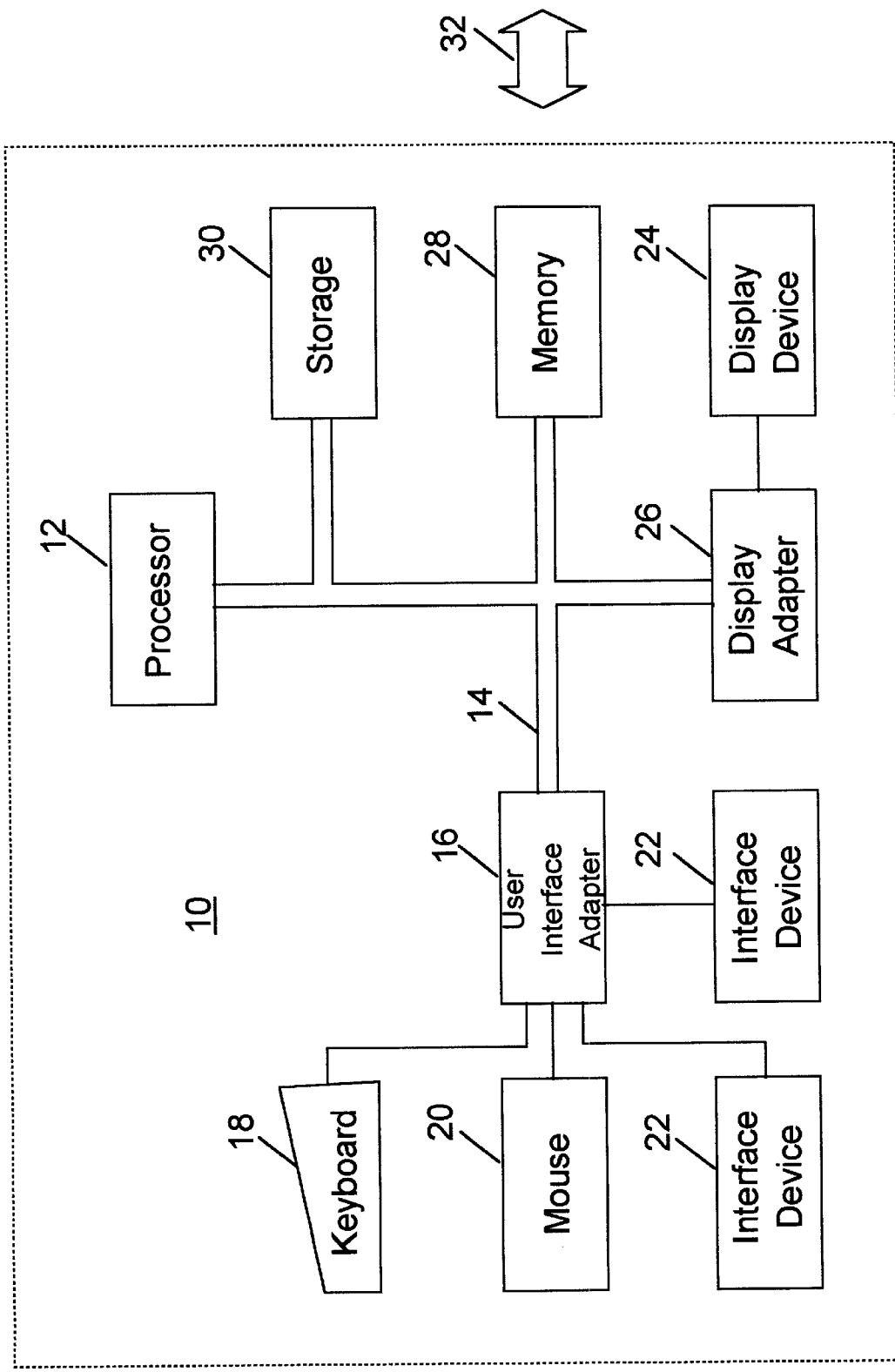
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
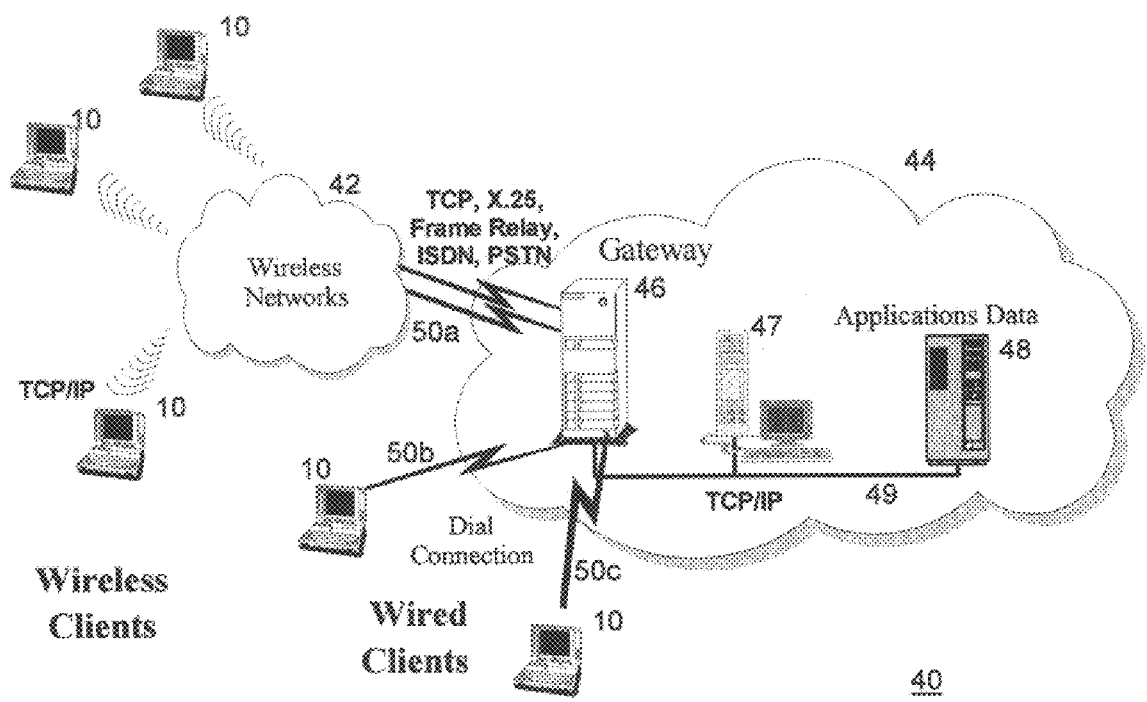
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiments, the present invention is implemented as one or more computer software programs. The software may operate on a server in a network, as one or more modules (also referred to as code subroutines, or "objects" in object-oriented programming) which are invoked upon request. The invention may be implemented on an intermediate Web proxy, or on a server. For ease of reference, the term "server" will be used to denote either of these devices as the device on which processing is performed before sending a document to a client. The server may be functioning as a Web server, where that Web server provides services in response to requests from a client connected through the Internet. Alternatively, the server may be in a corporate intranet or extranet of which the client's workstation is a component, or in any other network environment. Alternatively, the present invention may execute on a client device in a proper environment (e.g. where the client has access to a stored repository of style sheet characteristics).

The present invention defines a novel technique for retrieving style sheets from a data repository based upon matching one or more stored characteristics of a style sheet against a pattern. Preferably, the data repository will be an LDAP directory. A communications protocol is used to access the stored information in an on-line directory. A popular protocol for accessing directories, such as X.500 directories, is the Lightweight Directory Access Protocol (hereinafter, "LDAP"). LDAP does not require X.500 directory services, and many implementations of LDAP use directory stores other than X.500. LDAP is specified as IETF (Internet Engineering Task Force) RFC (Request For Comments) 2251. The phrase "LDAP Directory" is used herein to refer to directories accessed using LDAP.

(For ease of reference, documents encoded in markup languages will be referred to hereinafter as "XML documents", although it is to be understood that the present invention applies to documents encoded in alternative notations as well. Similarly, style sheets will be referred to as "XSL style sheets", although the present invention is applicable to other style sheet notations.)

The preferred embodiments of the present invention will now be discussed in more detail with reference to FIGS. 3 through 5.

FIG. 3A depicts an example of the syntax with which style sheet characteristics may be encoded within a style sheet. In the preferred embodiments, characteristic elements are specified using a prefix which indicates the namespace in which they have been predefined. As is known in the art, using a namespace prefix enables differentiation among tags that might otherwise be considered duplicates. In addition, a namespace reference identifies the DTD in which the tags which use that prefix are defined. FIG. 3A shows an XSL style sheet 300 where a namespace reference and characteristic elements are specified, as shown at 305. The element 306 identifies the namespace, which in this case is an example URL (Uniform Resource Locator) identifying a DTD stored at a hypothetical location "www.ibm.com/char-DTD". Within this element 306, the prefix to be used in distinguishing names in this namespace is chosen to be "chars", as indicated at 307. In this example, characteristics have been included which specify: the XML dialect which this style sheet generates (using the tag "<chars:XMLlang>", which has the value "PGML"); the type of device for which this style sheet is adapted (using the tag "<chars:DEVICE>", which has the value "VELO500"); the device uses 4 bits to represent different shades of color (as specified by the "<chars:DISPLAYBITS> tag, which has the value 4); etc. As will be obvious to one of ordinary skill in the art, other tag syntax for the characteristics as well as the elements could be used alternatively. The specific characteristic elements which are used in a particular style sheet will vary depending on the rules encoded in the style sheet, and thus the example in FIG. 3A is for illustrative purposes only.

In the preferred embodiments, a style sheet developer determines which characteristics are appropriate for each style sheet, and associates those characteristics with a style sheet by encoding the characteristics directly in the style sheet. As an alternative to using the technique shown in FIG. 3A where the characteristic information 305 is an element of the style sheet, the characteristics may instead be encoded within comment syntax. This approach has the advantage of enabling style sheets containing characteristics to be processed by style sheet processors which do not understand the characteristic tags, providing backward compatibility. As a further alternative (which also provides backward compatibility), the characteristics may be stored separately from the style sheets, such that a lookup table or other mechanism can be used to associate a group of characteristics with each style sheet of interest. The information for a particular characteristic may be considered a characteristic pair, where the first element of the pair is the characteristic identifier (such as DEVICE, DISPLAYBITS, etc.) and the second element is the value associated with that identifier (the values VELO500 and 4, respectively, in the example of FIG. 3A). Thus, it is not necessary that the associated characteristics be represented using a tag syntax such as shown in FIG. 3A when the information is not encoded as elements of a style sheet. The manner in which the style sheet characteristics are determined does not form part of the present invention.

In a first preferred embodiment of the present invention, the characteristics of a style sheet are stored using an LDAP object in an LDAP directory, where the LDAP object has 3 attributes. A first attribute, which will be referred to herein as "ATT1", serves as the relative distinguished name for the object. This is simply a unique identifier for storing the object in the directory. The second attribute, which will be referred to as "ATT2", stores the characteristics of a particular style sheet which is identified by the third attribute, "ATT3". In this first embodiment, the characteristics are stored in ATT2 as one long character string, where special delimiters are used to separate each pair from the next and to separate the two elements of each pair. An example string 320 is shown in FIG. 3B, corresponding to the characteristic pairs specified at 305 in FIG. 3A. In this example, the syntax "/" has been used to separate the characteristic pairs, and the syntax "." has been used to separate each characteristic identifier from its value.

Figure 4:
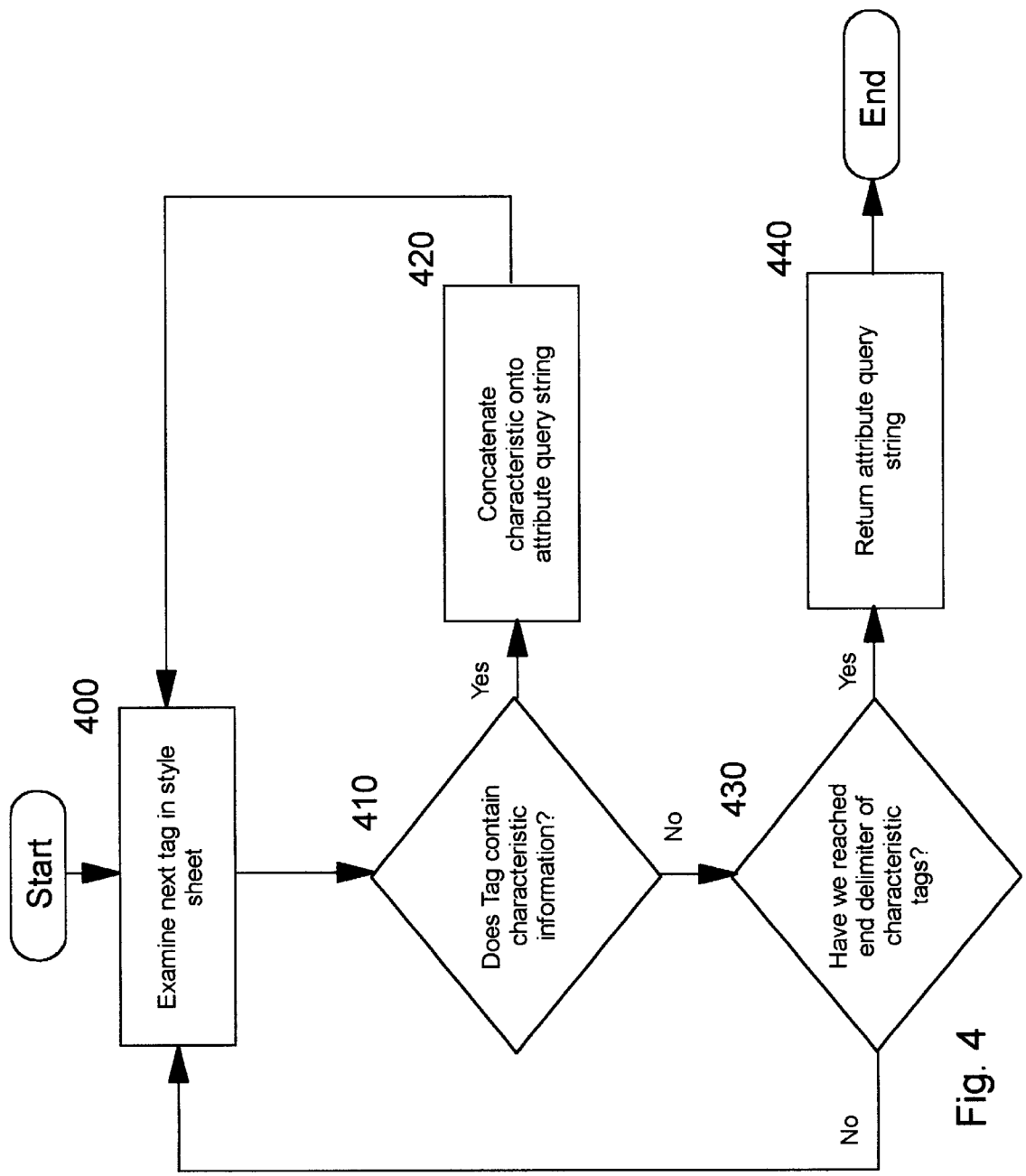
FIG. 4 illustrates a flow chart which sets forth the logic involved with a first preferred embodiment of the present invention.

FIG. 4 shows the logic with which the characteristics can be extracted from a style sheet, and used to create the attribute string stored as ATT2. The process begins at Block 400, where the next tag in the style sheet is examined. Block 410 checks to see if this tag contains characteristic information. This can be done by detecting that the opening characteristic tag has been reached, but that the closing characteristic tag has not. When this test has a positive response, Block 420 extracts the tag syntax and its value, and concatenates them onto a string which is being created for ATT2. This process includes inserting the appropriate delimiter syntax. For example, when the <XMLlang> tag has been parsed by Block 400, Block 420 will create an initial string value of "/XMLlang.PGML". Control then returns to Block 400 to examine the next tag.

When Block 410 has a negative response, Block 430 checks to see if the ending tag or delimiter for the characteristics has been reached. When this test has a positive response, then the attribute string value for ATT2 is complete, and Block 440 returns that string value for storing in the LDAP object. The processing of FIG. 4 then ends. Otherwise, control returns to Block 400 to examine the next tag in the style sheet.

Preferably, characteristic elements will be encoded in the prolog of a style sheet. Thus, FIG. 4 does not include logic to detect reaching the end of the document file before reaching the end of the characteristics. It will be obvious to one of ordinary skill in the art bow the logic of FIG. 4 can be adapted when characteristics are stored in other forms than elements of a style sheet.

Using the object structure of the first preferred embodiment, the LDAP query engine can be used to process queries that will match query patterns (encoded in LDAP syntax) against one or more of the characteristic pairs stored in the attribute string ATT2. Multiple query patterns may therefore retrieve the same style sheet. FIG. 3C shows 3 different query patterns that will match the characteristics for the style sheet 300 of FIG. 3A, which have been stored as attribute string 320 (shown in FIG. 3B) using the logic of FIG. 4. The LDAP syntax of the first search pattern in FIG. 3C indicates that the search must locate a match with the characteristic "DEVICE", having a value which begins with "VELO". The "*" syntax shown is a wildcard, which matches zero or more characters. The "/" in the search pattern serves to anchor the search at specific points in the attribute string (i.e. in those places where the "/" is encoded). The first search pattern also requires a match against the characteristic "XMLlang", having the value "PGML". The requirement for both patterns to be matched is indicated by the presence of the "&" character. Since the attribute string 320 includes the specified patterns, it will successfully match the query, and therefore the identifier of the associated style sheet (stored in ATT3) will be retrieved. This technique of specifying a subset of the characteristic pairs is referred to herein as a "partial characteristic match". By comparing the remaining two search patterns with the attribute string 320 in FIG. 3B, it can be seen that each of these queries will also match, and will therefore also retrieve the identifier of the associated style sheet.

Note that the LDAP directory's search engine is used to process the queries, using techniques which are known in the art, and thus the processing of the search is not described in detail herein.

The solution of the first preferred embodiment has one potential drawback. Storing the characteristics as a single string may result in a significant amount of overhead when processing searches, if a large number of characteristic pairs have been specified. This is because each characteristic pattern phrase of the search must begin with a wild card and a "/" delimiter, and must end with a wild card, in order to eliminate the unspecified characteristics from the matching process. This eliminates the ability to use an index (such as a hash table) that the directory or back-end database might create for the ATT2 attribute to increase search efficiency. The second preferred embodiment addresses this potential drawback by defining a different storage approach for the characteristic pairs. In this second embodiment, the LDAP object's characteristics attribute ATT2 is multi-valued, meaning that it can contain an unordered set of values. A relative distinguished name is used to identify the LDAP object, and the style sheet identifier is stored in the object, as described for ATT1 and ATT3 (respectively) of the first preferred embodiment. Each of the characteristic pairs becomes a string value in the ATT2 attribute unordered values set. Since an index of ATT2 is constructed by the back-end database from individual values rather than at the object attribute set level (i.e. for all of ATT2, as in the first embodiment), the search process will speed up as there is no longer a need for a prefix and suffix "match any" pattern in the search sub-expression elements. (The absence of the "match any" pattern when using the second embodiment can be seen by comparing the search patterns of FIG. 3C to those of FIG. 3D, where the wildcards "*" in each sub-expression are now omitted except where the wildcard applies to the characteristic pair itself.)

Figure 5:
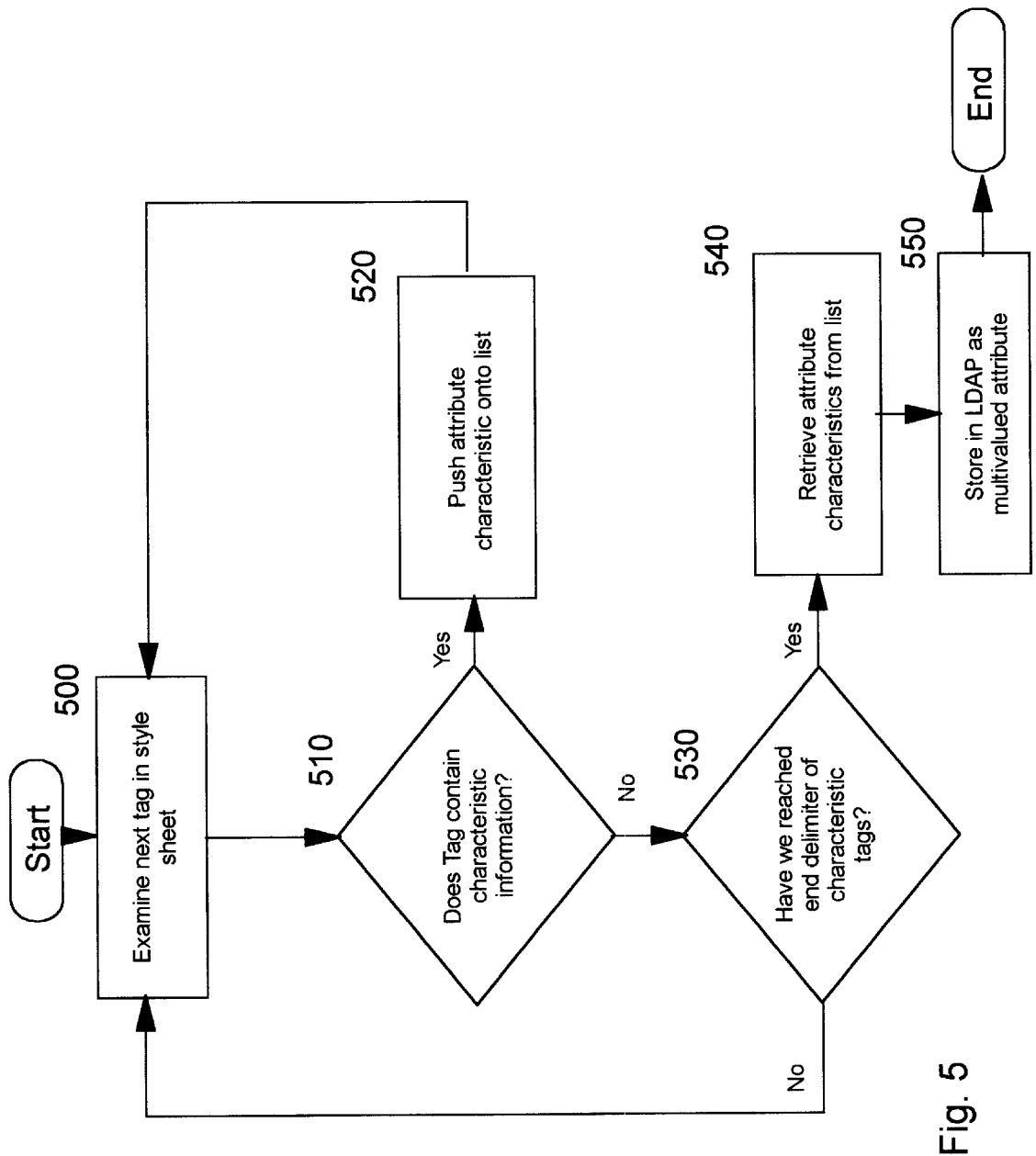
FIG. 5 illustrates a flow chart depicting the logic of a second preferred embodiment of the present invention.

FIG. 5 illustrates how the characteristic pairs are extracted and stored into ATT2 in this second embodiment. The process begins at Block 500, where the next tag in the style sheet is extracted as discussed above for Block 400 of FIG. 4. Block 510 then checks to see if the tag contains characteristic information. If so, Block 520 pushes the characteristic pair onto a list, and control returns to Block 500. If Block 510 has a negative result, then Block 530 checks to see if the end delimiter for the characteristics has been reached. If not, control returns to Block 500; otherwise, control transfers to Block 540. At Block 540, all the characteristic pairs have been located and extracted from the style sheet. Block 540 therefore retrieves the list where the pairs have been accumulated, and Block 550 stores these pairs as the multi-valued attribute (ATT2) of the LDAP object. The process of FIG. 5 then ends.

As with the first preferred embodiment, multiple query patterns may retrieve the same style sheet in the second embodiment. FIG. 3D shows 3 different query patterns that represent the same queries depicted in FIG. 3C, and which correspond to the characteristics for the style sheet 300 of FIG. 3A. As seen by comparing the query syntax of FIG. 3C to that of FIG. 3D, it can be seen that the wildcards and "/" delimiters are no longer required. (While a wildcard is specified in the first query pattern in FIG. 3D, this is a wildcard to be applied only to the value of the DEVICE characteristic, and thus will not incur the overhead penalties described above for wildcards in the first preferred embodiment.)

The preferred embodiments of the present invention provide a number of advantages for retrieving style sheets that match criteria such as user preferences, device type, and browser type. First, it is not necessary to know all the characteristic identifiers in order to retrieve a style sheet, due to the partial matching technique defined herein. This will be very beneficial as usage of style sheet characteristics increases over time, defining applicability of style sheets more precisely. Second, when user-specific (or perhaps corporate-level, department-level, etc.) style sheets have been defined, the present invention will enable retrievals to treat such style sheets with preference over more generic style sheets. This can be accomplished by first attempting the more specific match, and following this query with a subsequent query to retrieve the general style sheet only if the first query fails. This approach enables the general style sheets to be used as defaults. A third advantage is the increased manageability of style sheets that comes with storing them in a directory. This approach enables the style sheets to be available throughout the network, and the access control mechanisms provided by LDAP directories can be leveraged to control access to the style sheets. Only authorized users will be able to retrieve style sheets, and to update them (and their associated characteristics). Updates, when made, will be available nearly in real time. Finally, a significant amount of processing can be offloaded to the directory and its processor, which will perform the actual storage and retrieval of the style sheets (through API invocations from the present invention) as well as the pattern-matching searches. Because the back-end system is optimized for these operations, the present invention can leverage these facilities to increase its efficiency.

Although the preferred embodiment has been described as using XSL style sheets, style sheets in other notations may be used instead of XSL (e.g. Document Style Semantics and Specification Language, or DSSSL, which is an International Standard ISO/IEC 10179:1996) without deviating from the inventive concepts of the present invention.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code readable by a computer system in said environment, for retrieving style sheets from a repository based upon partial characteristic mapping, comprising:

a subprocess for associating one or more characteristics with each of one or more style sheets;

a subprocess for extracting each of said associated characteristics for selected ones of said style sheets; and a subprocess for storing said extracted characteristics for each of said selected style sheets in said repository, along with an identifier of said selected style sheet to which said stored characteristics pertain.

2. Computer readable code for retrieving style sheets from a repository based upon partial characteristic mapping according to claim 1, further comprising:

a subprocess for specifying a pattern for a desired set of characteristics;

a subprocess for matching said pattern against a collection of said stored characteristics from said repository; and a subprocess for retrieving a particular style sheet using said style sheet identifier located by said subprocess for matching when said subprocess for matching has a successful result.

3. Computer readable code for retrieving style sheets from a repository based upon partial characteristic mapping according to claim 2, wherein said associated characteristics are specified as pairs, each of said pairs comprising a characteristic identifier and a characteristic value for said identifier.

4. Computer readable code for retrieving style sheets from a repository based upon partial characteristic mapping according to claim 3, wherein said pattern comprises one or more sub-patterns, each of said sub-patterns comprising a specified characteristic identifier and a specified characteristic value, wherein said specified characteristic identifier and said specified characteristic value may use one or more wildcard characters.

5. Computer readable code for retrieving style sheets from a repository based upon partial characteristic mapping according to claim 3, further comprising:

a subprocess for creating an object, wherein said object comprises: a first attribute, a second attribute, and a third attribute; and wherein said subprocess for storing further comprises:

a subprocess for storing a unique identifier of said object in said first attribute;

a subprocess for storing said stored extracted characteristics in said second attribute, wherein said characteristic pairs are delimited from one another using a first special character and wherein said characteristic identifier is delimited from said characteristic value in each of said pairs using a second special character; and a subprocess for storing said identifier of said selected style sheet in said third attribute.

6. Computer readable code for retrieving style sheets from a repository based upon partial characteristic mapping according to claim 3, further comprising:

a subprocess for creating an object, wherein said object comprises: a first attribute, a second attribute, and a third attribute; and wherein said subprocess for storing further comprises:

a subprocess for storing a unique identifier of said object in said first attribute;

a subprocess for storing said extracted characteristics as an unordered set of values in said second attribute, wherein each of said values stores one of said pairs; and a subprocess for storing said identifier of said selected style sheet in said third attribute.

7. Computer readable code for retrieving style sheets from a repository based upon partial characteristic mapping according to claim 6, wherein said characteristic identifier and said characteristic value in each of said pairs are delimited using a special character.

8. Computer readable code for retrieving style sheets from a repository based upon partial characteristic mapping according to claim 5 or claim 6, wherein said repository is a directory database.

9. Computer readable code for retrieving style sheets from a repository based upon partial characteristic mapping according to claim 8, wherein said directory database is an LDAP database, and said object is an LDAP object.

10. A system for retrieving style sheets from a repository based upon partial characteristic mapping in a computing environment capable of having a connection to a network, comprising:

means for associating one or more characteristics with each of one or more style sheets;

means for extracting each of said associated characteristics for selected ones of said style sheets; and means for storing said extracted characteristics for each of said selected style sheets in said repository, along with an identifier of said selected style sheet to which said stored characteristics pertain.

11. The system for retrieving style sheets from a repository based upon partial characteristic mapping according to claim 10, further comprising:

means for specifying a pattern for a desired set of characteristics;

means for matching said pattern against a collection of said stored characteristics from said repository; and means for retrieving a particular style sheet using said style sheet identifier located by said means for matching when said means for matching has a successful result.

12. The system for retrieving style sheets from a repository based upon partial characteristic mapping according to claim 11, wherein said associated characteristics are specified as pairs, each of said pairs comprising a characteristic identifier and a characteristic value for said identifier.

13. The system for retrieving style sheets from a repository based upon partial characteristic mapping according to claim 12, wherein said pattern comprises one or more sub-patterns, each of said sub-patterns comprising a specified characteristic identifier and a specified characteristic value, wherein said specified characteristic identifier and said specified characteristic value may use one or more wildcard characters.

14. The system for retrieving style sheets from a repository based upon partial characteristic mapping according to claim 12, further comprising:

means for creating an object, wherein said object comprises: a first attribute, a second attribute, and a third attribute; and wherein said means for storing further comprises:

means for storing a unique identifier of said object in said first attribute;

means for storing said stored extracted characteristics in said second attribute, wherein said characteristic pairs are delimited from one another using a first special character and wherein said characteristic identifier is delimited from said characteristic value in each of said pairs using a second special character; and means for storing said identifier of said selected style sheet in said third attribute.

15. The system for retrieving style sheets from a repository based upon partial characteristic mapping according to claim 12, further comprising:

means for creating an object, wherein said object comprises: a first attribute, a second attribute, and a third attribute; and wherein said means for storing further comprises:

means for storing a unique identifier of said object in said first attribute;

means for storing said extracted characteristics as an unordered set of values in said second attribute, wherein each of said values stores one of said pairs; and means for storing said identifier of said selected style sheet in said third attribute.

16. The system for retrieving style sheets from a repository based upon partial characteristic mapping according to claim 15, wherein said characteristic identifier and said characteristic value in each of said pairs are delimited using a special character.

17. The system for retrieving style sheets from a repository based upon partial characteristic mapping according to claim 14 or claim 15, wherein said repository is a directory database.

18. The system for retrieving style sheets from a repository based upon partial characteristic mapping according to claim 17, wherein said directory database is an LDAP database, and said object is an LDAP object.

19. A method for retrieving style sheets from a repository based upon partial characteristic mapping in a computing environment capable of having a connection to a network, comprising the steps of:

associating one or more characteristics with each of one or more style sheets;

extracting each of said associated characteristics for selected ones of said style sheets; and storing said extracted characteristics for each of said selected style sheets in said repository, along with an identifier of said selected style sheet to which said stored characteristics pertain.

20. The method for retrieving style sheets from a repository based upon partial characteristic mapping according to claim 19, further comprising the steps of:

specifying a pattern for a desired set of characteristics;

matching said pattern against a collection of said stored characteristics from said repository; and retrieving a particular style sheet using said style sheet identifier located by said matching step when said matching step has a successful result.

21. The method for retrieving style sheets from a repository based upon partial characteristic mapping according to claim 20, wherein said associated characteristics are specified as pairs, each of said pairs comprising a characteristic identifier and a characteristic value for said identifier.

22. The method for retrieving style sheets from a repository based upon partial characteristic mapping according to claim 21, wherein said pattern comprises one or more sub-patterns, each of said sub-patterns comprising a specified characteristic identifier and a specified characteristic value, wherein said specified characteristic identifier and said specified characteristic value may use one or more wildcard characters.

23. The method for retrieving style sheets from a repository based upon partial characteristic mapping according to claim 21, further comprising the step of:

creating an object, wherein said object comprises: a first attribute, a second attribute, and a third attribute; and wherein said storing step further comprises the steps of:

storing a unique identifier of said object in said first attribute;

storing said stored extracted characteristics in said second attribute, wherein said characteristic pairs are delimited from one another using a first special character and wherein said characteristic identifier is delimited from said characteristic value in each of said pairs using a second special character; and storing said identifier of said selected style sheet in said third attribute.

24. The method for retrieving style sheets from a repository based upon partial characteristic mapping according to claim 21, further comprising the step of:

creating an object, wherein said object comprises: a first attribute, a second attribute, and a third attribute; and wherein said storing step further comprises the steps of:

storing a unique identifier of said object in said first attribute;

storing said extracted characteristics as an unordered set of values in said second attribute, wherein each of said values stores one of said pairs; and storing said identifier of said selected style sheet in said third attribute.

25. The method for retrieving style sheets from a repository based upon partial characteristic mapping according to claim 24, wherein said characteristic identifier and said characteristic value in each of said pairs are delimited using a special character.

26. The method for retrieving style sheets from a repository based upon partial characteristic mapping according to claim 23 or claim 24, wherein said repository is a directory database.

27. The method for retrieving style sheets from a repository based upon partial characteristic mapping according to claim 26, wherein said directory database is an LDAP database, and said object is an LDAP object.

* * * * *